US009443071B2

(12) United States Patent
Horton

(10) Patent No.: US 9,443,071 B2
(45) Date of Patent: Sep. 13, 2016

(54) PROXIMITY BASED DEVICE SECURITY

(75) Inventor: Michael Horton, Bothell, WA (US)

(73) Assignee: AT&T Intellectual Property I, L.P., Atlanta, GA (US)

(\*) Notice: Subject to any disclaimer, the term of this patent is extended or adjusted under 35 U.S.C. 154(b) by 529 days.

(21) Appl. No.: 12/818,988

(22) Filed: Jun. 18, 2010

(65) Prior Publication Data

US 2011/0314539 A1 Dec. 22, 2011

(51) Int. Cl.
*G06F 13/00* (2006.01)
*G06F 7/04* (2006.01)
*G06F 21/35* (2013.01)
*H04L 9/32* (2006.01)
*H04L 29/06* (2006.01)
*H04W 12/06* (2009.01)
*H04W 88/02* (2009.01)

(52) U.S. Cl.
CPC ............ *G06F 21/35* (2013.01); *H04L 9/3231* (2013.01); *H04L 9/3234* (2013.01); *H04L 63/0853* (2013.01); *H04W 12/06* (2013.01); *H04W 88/02* (2013.01)

(58) Field of Classification Search
CPC .................................................. G06F 21/34
USPC ......................................................... 726/20
See application file for complete search history.

(56) References Cited

U.S. PATENT DOCUMENTS

| 5,083,968 A | | 1/1992 | Hart | |
|---|---|---|---|---|
| 5,719,551 A | * | 2/1998 | Flick | 340/426.25 |
| 5,724,028 A | * | 3/1998 | Prokup | 701/36 |
| 5,796,935 A | * | 8/1998 | Morrison et al. | 714/11 |
| 5,799,086 A | | 8/1998 | Sudia | |
| 5,953,844 A | * | 9/1999 | Harling et al. | 42/70.06 |
| 6,338,140 B1 | * | 1/2002 | Owens et al. | 713/168 |
| 6,535,136 B1 | * | 3/2003 | Rodenbeck et al. | 340/686.6 |
| 6,742,714 B2 | * | 6/2004 | Cecil et al. | 235/492 |
| 7,302,571 B2 | * | 11/2007 | Noble et al. | 713/172 |
| 7,412,542 B1 | * | 8/2008 | Newson et al. | 709/249 |
| 7,539,565 B2 | * | 5/2009 | McBride et al. | 701/36 |
| 7,715,593 B1 | | 5/2010 | Adams | |
| 7,748,618 B2 | | 7/2010 | Vawter | |
| 7,848,746 B2 | * | 12/2010 | Juels | 455/424 |
| 7,944,354 B2 | * | 5/2011 | Kangas et al. | 340/568.5 |
| 2003/0062996 A1 | * | 4/2003 | Flanagan | B60R 99/00 340/457 |
| 2003/0228846 A1 | * | 12/2003 | Berliner et al. | 455/67.11 |

(Continued)

OTHER PUBLICATIONS

U.S. Official Action mailed in U.S. Appl. No. 14/158,907, filed Oct. 9, 2014.

(Continued)

*Primary Examiner* — William Powers
(74) *Attorney, Agent, or Firm* — Hartman & Citrin LLC

(57) ABSTRACT

Devices, systems and methods are disclosed for additional security, functionality, and convenience in the operation of a wireless communication device with the use of a separate proximity security token in communication with the wireless communication device. In exemplary embodiments, the token is carried by the user while device logic is installed on the user's wireless communication device. The device logic along with transceivers allows the device to sense proximity of the token through wireless communication. Given a certain range of the proximity security token, as determined by the wireless signal strength, the device logic determines whether the device is in a locked or unlocked state. If the proximity security token is outside the range, then the device is locked. The proximity security token uses ultra low power communications for optimal battery life.

20 Claims, 12 Drawing Sheets

(56) References Cited

U.S. PATENT DOCUMENTS

| | | | |
|---|---|---|---|
| 2004/0250074 A1* | 12/2004 | Kilian-Kehr | 713/172 |
| 2005/0105734 A1* | 5/2005 | Buer et al. | 380/270 |
| 2006/0021005 A1* | 1/2006 | Williams et al. | 726/2 |
| 2006/0028674 A1* | 2/2006 | Lapstun | G02B 26/06 358/1.15 |
| 2008/0028230 A1* | 1/2008 | Shatford | H04L 9/3231 713/186 |
| 2009/0207013 A1* | 8/2009 | Ayed | 340/539.1 |
| 2009/0228983 A1 | 9/2009 | Qin | |
| 2010/0029200 A1* | 2/2010 | Varriale et al. | 455/41.1 |

OTHER PUBLICATIONS

U.S. Office Action dated Jan. 28, 2015 in U.S. Appl. No. 14/158,907.

\* cited by examiner

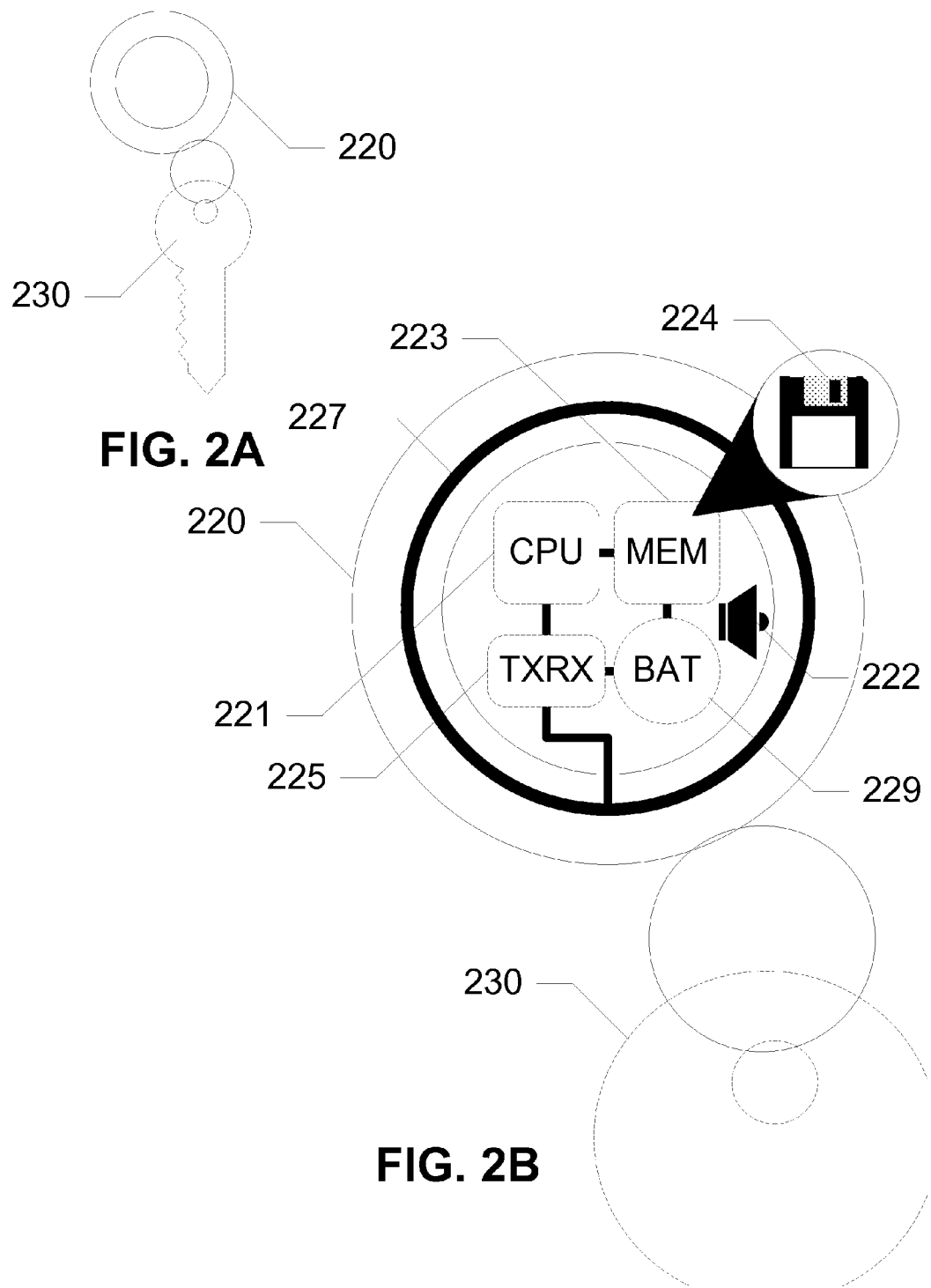

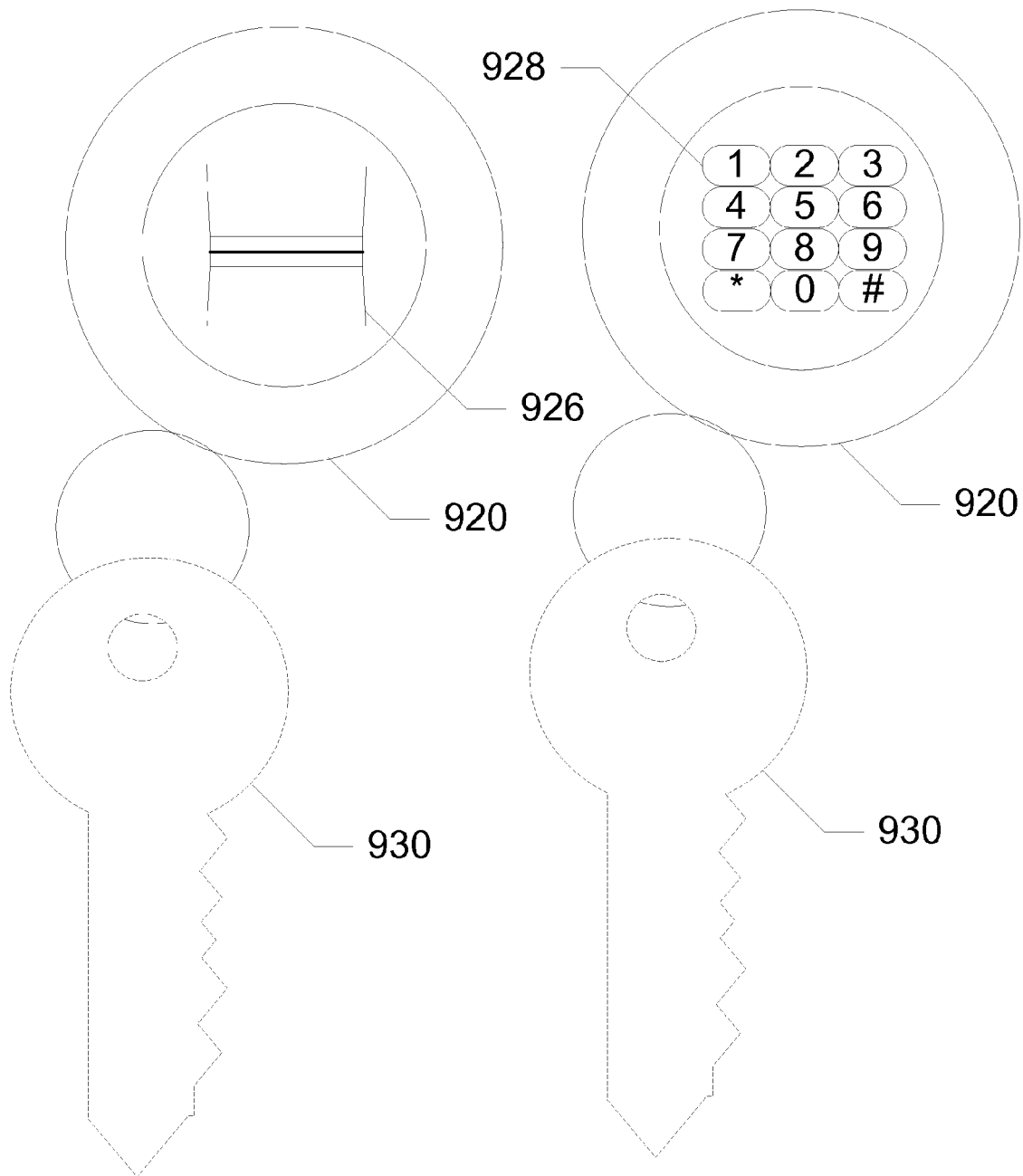
FIG. 9A  FIG. 9B

PROXIMITY BASED DEVICE SECURITY

BACKGROUND OF THE INVENTION

1. Field of the Invention

The present invention relates to device security. More specifically, the present invention relates to using a proximity security token to provide proximity-based device security.

2. Background of the Invention

Communications devices, such as cellular telephones, have become a common tool of everyday life. Cellular telephones are no longer simply used to place telephone calls. With the number of features available rapidly increasing, cellular telephones, often in the form of a smartphone, are now used for storing addresses, keeping a calendar, reading e-mails, drafting documents, etc. With this wide range of features comes an even greater need for security. For instance, e-mails or documents may be private or privileged and need to be safe from unauthorized users. An unauthorized user picking up or stealing the smartphone should not be able to access this private information.

As more enterprises turn towards smartphones, the ability to lock phones is a necessity. Currently, smartphones may be password protected through the keypad. However, users of smartphones find password locks on smartphones annoying and inconvenient. The user sets up a password consisting of a series of keystrokes which must be re-entered to later access the cellular phone. These passwords can generally be any number of characters which the user will remember. Ideally, the password is challenging enough that an unauthorized user cannot simply guess the password and gain access. A problem with using simply a keypad for password entry is the ability of others to determine the password without the user's knowledge. Someone may be able to see the user enter the password and easily be able to repeat it. Additionally, these passwords are inconvenient, as users must look directly at the keypad and press a sequence of buttons. The keys are often small with hard to read numbers or letters and lockouts may require frequent use of the passwords. Thus, users often choose to disable such features. More of these users may choose to utilize the security mechanisms if such mechanisms were easier and more convenient. Such security becomes even more important as devices are used more frequently as a means for mobile payments.

What is needed is a way to secure a device while keeping the device easily accessible to an authorized user.

SUMMARY OF THE INVENTION

The present invention addresses the above-identified issues by providing a separate proximity security token in communication with a wireless communication device. In exemplary embodiments, the token is carried by the user while device logic is installed on the user's wireless communication device. The device logic along with transceivers allows the wireless communication device to sense proximity of the token through wireless communication. Given a certain range of the proximity security token, as determined by the wireless signal strength, the device logic locks or unlocks the wireless communication device. In embodiments of the invention, if the proximity security token is too far away, then the wireless communication device is locked and can only be accessed via a backup method of entering a password or other direct input form such as voice authentication. Embodiments of the proximity security token solution make use of ultra low power communications so that the proximity security token does not need to be continuously recharged, but instead is powered by a coin cell battery.

The proximity security token also provides an enhanced two factor authentication function for controlling other services on the wireless communication device or web based services via the wireless communication device. Exemplary embodiments of the present invention include an input, such as a biometric scanner, within the proximity security token. The input provides for further authentication based upon the identity of the user or an entry.

In one exemplary embodiment, the present invention is a wireless communication device for allowing use when in range of a proximity security token. The device includes a processor, a memory in communication with the processor, a transceiver in communication with the processor, and a device logic on the memory. The device logic detects the presence of the proximity security token, receives a key from the proximity security token, allows use of the device, and monitors the presence of the proximity security token while the device is in use. The device logic prevents use of the device upon detecting an absence of the proximity security token.

In another exemplary embodiment, the present invention is a proximity security token for allowing use of a wireless communication device when in range of the wireless communication device. The proximity security token includes a processor, a memory in communication with the processor, a transceiver in communication with the processor, a secure input in communication with the processor, a battery in communication with the processor, and a token logic on the memory. The token logic detects the presence of the wireless communication device, receives a key from a user via the secure input, transmits the key to the wireless communication device, and monitors the presence of the wireless communication device while the wireless communication device is in use. The token logic prevents use of the wireless communication device upon detecting an absence of the wireless communication device.

In yet another exemplary embodiment, the present invention is a method for allowing use of a wireless communication device when in range of a proximity security token. The method includes detecting the presence of the proximity security token, receiving a secure input from the proximity security token, allowing use of the device, and monitoring the presence of the proximity security token while the device is in use. Use of the device is prevented upon detecting an absence of the proximity security token.

BRIEF DESCRIPTION OF THE DRAWINGS

FIGS. 2A and 2B show a proximity security token, or fob, according to an exemplary embodiment of the present invention.

FIGS. 9A and 9B show proximity security tokens with an embedded input, according to embodiments of the present invention.

DETAILED DESCRIPTION OF THE INVENTION

Figures 1A, 1B:
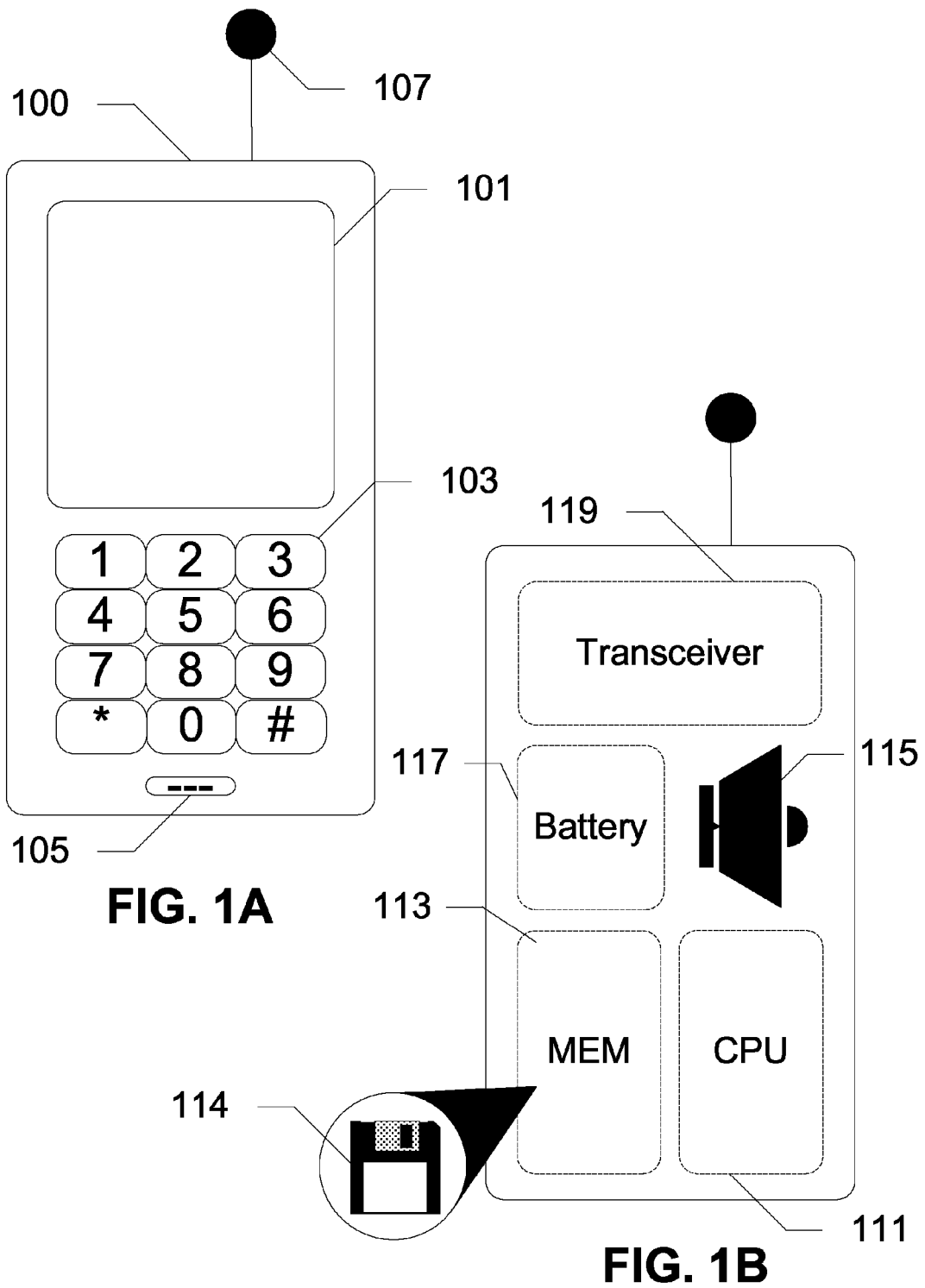
FIGS. 1A and 1B show a wireless communication device for use with a proximity security token, according to an exemplary embodiment of the present invention.

The following detailed description discloses devices, systems, and methods for additional security, functionality, and convenience in the operation of a wireless communication device with the use of a separate proximity security token in communication with the wireless communication device. In exemplary embodiments, the token is carried by the user while device logic is installed on the user's wireless communication device. The device logic, along with transceivers, allows the wireless communication device to sense proximity of the token through wireless communication. Given a certain range of the proximity security token, as determined by the wireless signal strength, the device logic locks or unlocks the wireless communication device. In embodiments of the invention, if the proximity security token is too far away, then the wireless communication device is locked and can only be accessed via a backup method of entering a password or other direct input form such as voice authentication. Embodiments of the proximity security token solution make use of ultra low power communications so that the proximity security token does not need to be continuously recharged, but instead is powered by a long life coin cell battery.

The proximity security token also provides enhanced two factor authentication function for controlling other services on the wireless communication device or web based services via the wireless communication device. Exemplary embodiments of the present invention contain an input, such as a biometric scanner, within the proximity security token. The input provides for further authentication based upon the identity of the user or an entry.

In further exemplary embodiments, the proximity security token operates in one of two possible states of "active and unlocked" and "inactive and locked". The biometric function on the proximity security token is utilized to authenticate the user to the proximity security token and thus put the proximity security token in an "active and unlocked" state.

In the "active and unlocked" state, the proximity security token is able to communicate an approved unlock code to the wireless communication device via proximity communications. The "active and unlocked" token state may be based on a countdown timer sequence based upon user defined settings in logic on the wireless communication device logic. Once the timer expires, the proximity security token changes to an "inactive and locked" state that triggers a locked state being communicated to the wireless communication device. The user may put the proximity security token back into an "active and unlocked" state by performing an authentication activity directly on the proximity security token. This feature provides the user with safeguards against the wireless communication device remaining in an unlocked and user interface accessible state if the user loses control of both the proximity security token and the wireless device to, for instance, an attacker.

In further exemplary embodiments, the user is alerted of the separation of the wireless communication device and the proximity security token via an audible tone from the device and/or the proximity security token when the proximity security token and device are separated beyond a certain distance for a period of time defined by program logic. If the user leaves one or the other behind, then this makes the user aware that the wireless communication device or proximity security token is missing from their direct control. In exemplary embodiments of the invention, other security functions may be triggered so that data on the wireless communication device is properly secured when the proximity security token and wireless communication device become separated for an extended period of time. These security functions may include, but are not limited to, memory wipes, etc.

In exemplary embodiments of the invention, the proximity security token may be used by an assigned user to unlock building electronic access control systems, for unlocking and starting automobiles, etc. These embodiments may use the concept of unlocking the proximity security token with either a PIN code or biometric signature such as a fingerprint as a form of secondary authentication requirement so that the proximity security token is unlocked and able to approve the proximity based unlock of the system. In alternative forms these other systems being accessed may or may not require the secondary form of authentication in order to process a user requested function such as door entry or automobile ignition.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. A wireless communication device also includes smart cards, such as contactless integrated circuit cards (CICC). The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic.

Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Wireless communication devices may communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include WiFi and BLUETOOTH® networks, with communication being enabled by hardware elements called "transceivers." Wireless communication devices may have more than one transceiver, capable of communicating over different networks. For example, a cellular telephone can include a GPRS transceiver for communicating with a cellular base station, a WiFi transceiver for communicating with a WiFi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. A settings server is an example of such a server. A settings server can include several network elements, including other servers, and is part of a network, for example, a cellular network. A settings server hosts or is in communication with a database hosting an account for a user of a wireless communication device. The "user account" includes several attributes for a particular user, including a unique identifier of the wireless communication device(s) owned by the user, relationships with other users, driver settings, and other information.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a wireless communication device 100 for use with a proximity security token, according to an exemplary embodiment of the present invention. In this embodiment, wireless communication device 100 is a smartphone. Wireless communication device 100, using an onboard security application, exchanges signals with a proximity security token to determine whether the proximity security token is in proximity of wireless communication device 100. The signals include a unique identifier, such as a digital key. The unique identifier is unique to the proximity security token and is present to ensure that only the authorized proximity security token registers with wireless communication device 100. In exemplary embodiments of the present invention, with the proximity security token in close proximity, wireless communication device 100 is in an unlocked state, such that it may be operated by a user. Proximity is a distance that may be default or set by a user of wireless communication device 100.

FIG. 1A shows the external components of wireless communication device 100. Wireless communication device 100 includes a display 101, a keypad 103, a microphone 105, and an antenna 107. Display 101 may be a liquid crystal display (LCD), a light emitting diode display (LED), a touchscreen display, etc. and provides an output for applications stored on memory and executed by CPU. Keypad 103 provides for an input for device. Keypad 103 may contain alphanumeric keys as well as hotkeys, etc. Microphone 105 provides a further input for device. Microphone 105 may be used for voice calls, commands, recording, etc. Antenna 107 provides a means for sending and receiving signals from transceiver 119 to other devices, such as the proximity security token, or networks, such as cellular networks.

FIG. 1B shows the internal components of wireless communication device 100. The internal components include a central processing unit (CPU) 111, a memory 113 storing a device logic 114, a speaker 115, a battery 117 or other power supply, and a transceiver 119. CPU 111 controls the components of wireless communication device 100 by executing device logic 114 from memory 113. Memory 113 stores device logic 114 as well as other data for wireless communication device 100. Device logic 114 includes a security application for wireless communication device 100. In exemplary embodiments of the present invention, the security application provides for proximity-based security for wireless communication device 100. The security application operates transceiver 119 to send and receive signals to and from the proximity security token, measures the strength of the received signals, and determines whether the proximity security token is within an established proximity. If the proximity security token is within the established proximity of wireless communication device 100, then the security application allows access to wireless communication device 100 and/or applications on memory 113 of wireless communication device 100. If the proximity security token is not within the proximity, then the security application locks wireless communication device 100 and/or applications on wireless communication device 100. In addition to locking the device, the speaker may emit an audible alert.

The security application on logic 114 can lock wireless communication device 100 entirely, lock certain applications, or lock specific features of wireless communication device 100. For instance, when the proximity security token is out of range, logic 114 can lock a cellular transceiver on wireless communication device 100, thereby rendering wireless communication device 100 unable to connect to a cellular network. Alternatively, logic 114 can lock keypad 103 or touchscreen 101, thereby rendering wireless communication device 100 unusable. Specific folders or files, or sensitive data stored on memory 113 can be locked as well. Other combinations will be apparent to one of ordinary skill in the art in light of this disclosure.

FIGS. 2A and 2B show a proximity security token 220, or key fob, according to an exemplary embodiment of the present invention. Proximity security token 220 is a small hardware device with built-in authentication mechanisms. Proximity security token 220, when used in conjunction with a wireless communication device, allows access to the wireless communication device while proximity security token 220 is in proximity of the wireless communication device. In FIG. 2A, proximity security token 220 is shown in the form of a key fob. In this way, proximity security token 220 is attached to keys 230 such that it is likely kept with a user.

FIG. 2B shows the internal components of proximity security token 220. Proximity security token 220 contains a central processing unit (CPU) 221, a memory 223 containing a token logic 224, a battery 229 or other power supply, a transceiver 225, a speaker 222, and an antenna 227. CPU 221 controls the functions of proximity security token 220 according to logic 224 on memory 223. Memory 223 may be Random Access Memory (RAM), Read Only Memory (ROM), or any other means of physically storing logic 224. Battery 229 provides power to each of the components of proximity security token 220. In this exemplary embodiment, battery 229 is a coin cell battery, such as a watch battery. Transceiver 225 communicates with the wireless communication device, such as communicating with a smartphone. The communication occurs through antenna 227, which may be coiled around an outer perimeter of proximity security token 220. This communication may occur using any wireless technology, such as BLUETOOTH, BLUETOOTH LOW ENERGY (BLE), Near Field Communication (NFC), a proximity/contactless smart card, passive keyless entry, WiFi, cellular communication, etc. The communication is used to detect a distance between the wireless communication device and proximity security token 220, and transmit data between proximity security token 220 and the wireless communication device. The data includes a unique identifier identifying proximity security token 220. Speaker 222 provides an output for proximity security token 220. In this exemplary embodiment, speaker 222 emits an audible sound when proximity security token 220 is separated from the wireless communication device outside of the set proximity. The inner components of proximity security token 220 may be embedded within an outer cover of proximity security token 220, laminated between two external layers of proximity security token 220, or generally covered so as to maintain durability and weatherproofing of proximity security token 220.

In exemplary embodiments of a proximity security token, the proximity security token may include color diodes on the outer cover. The color diodes alert a user as to the state of the proximity security token and may further alert the user of available functions on a wireless communication device. For instance, the proximity security token may include red, yellow, and green diodes. The green diode may signify that the proximity security token is fully unlocked. The proximity security token may become fully unlocked, for instance, upon entry of a biometric by the user. In a fully unlocked state, the user may have full access to features and applications of the wireless communication device. The red diode may signify that the proximity security token is locked. The proximity security token may remain locked, for instance, when the proximity security token has not been activated and/or a user biometric has not been entered. In a locked state, the user may not be able to use any of the features or applications of the wireless communication device. The yellow diode may signify that the proximity security token is only partially unlocked. The proximity security token may be partially unlocked, for instance, when the proximity security token has been activated, but a user biometric has not been entered. In a partially unlocked state, the user may have access to certain features and applications of the wireless communication device, but not others. For instance, basic applications may be allowed while work applications remain locked. While three diodes are disclosed, embodiments of the invention may include any number or color of diodes.

Figure 3:
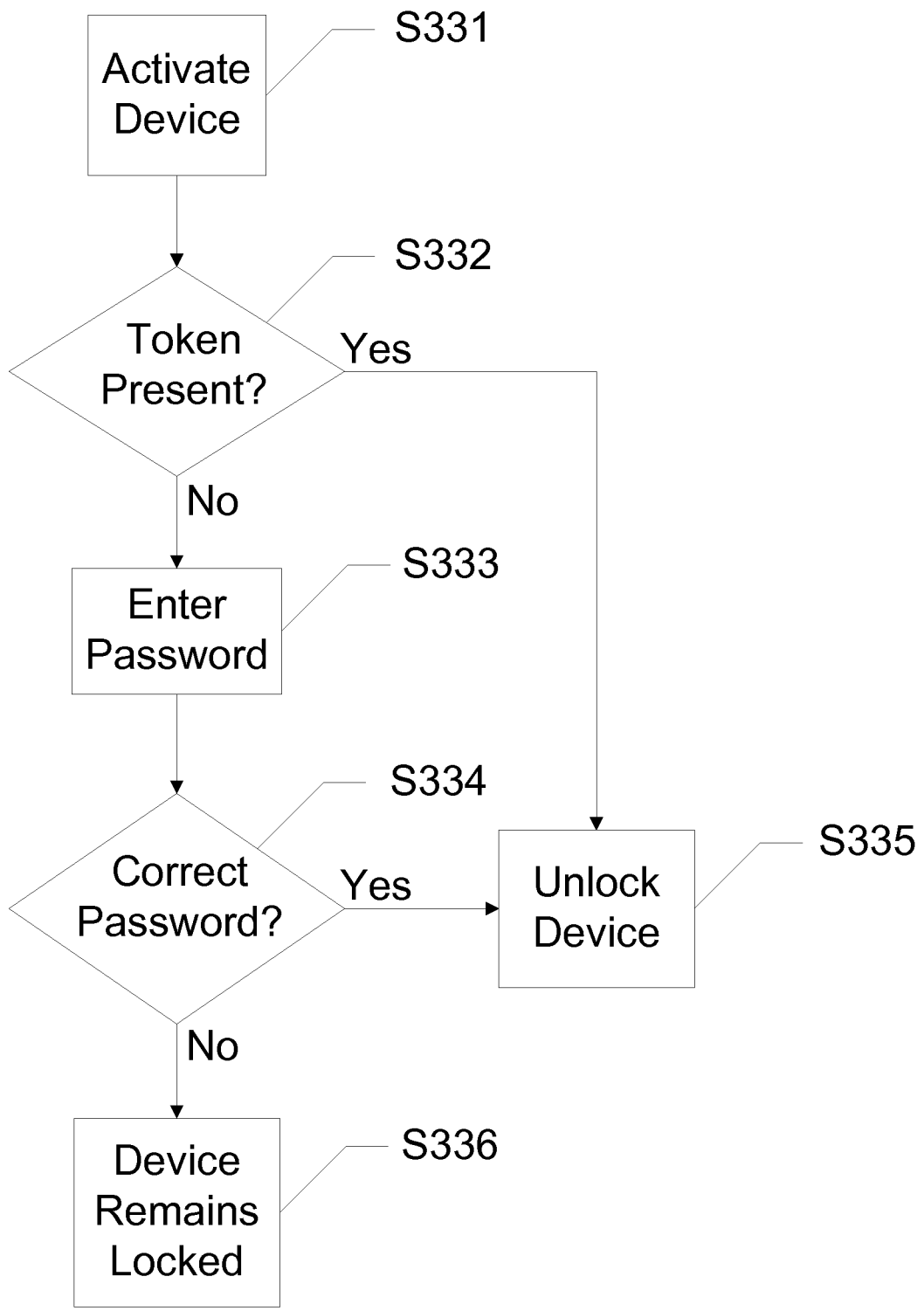
FIG. 3 shows a method of the present invention utilizing a password backup for the presence of a proximity security token, according to an exemplary embodiment of the present invention.

FIG. 3 shows a method of the present invention utilizing a password backup for the presence of a proximity security token, according to an exemplary embodiment of the present invention. In this embodiment, the presence of the proximity security token unlocks a wireless communication device. The method begins when a user activates a wireless communication device S331. Device logic on the wireless communication device, along with a processor and transceiver on the wireless communication device, determines whether a proximity security token is within a set proximity S332. This determination may be accomplished by measuring a signal strength of a signal from the proximity security token. The range of the set proximity may vary based upon the type of wireless communication device being used and the user's preference. If the proximity security token is within the set proximity, then the wireless communication device is unlocked S335 and may be used. If the proximity security token is not present, or out of range of the set proximity, then the user is prompted to enter a password S333. The device logic on the wireless communication device then determines whether the entered password is correct S334. If the entered password is incorrect, then the wireless communication device remains locked S336. If the entered password is correct, then the wireless communication device is unlocked S335 and becomes operable by the user.

In other exemplary embodiments, the password entry provides a second layer of security, being utilized in addition to the detected presence of the proximity security token, rather than as a replacement to requiring the proximity security token. In another exemplary embodiment, a user picks up the user's smartphone and attempts to use the smartphone. If the user has the proximity security token on their keychain in the user's pocket, or anywhere within a set proximity, then the smartphone unlocks, and the user may use the smartphone. If the user forgot the proximity security token at home, then the user is instead prompted to enter a password to unlock the smartphone. If the user enters the correct password, then the smartphone is unlocked. If the password is not correct, then the smartphone remains locked until a correct password is entered or the proximity security token becomes present. In other exemplary embodiments, entering an incorrect password multiple times may cause the smartphone to deny repeated password attempts and remain locked until the proximity security token is present. Alternatively, entering an incorrect password multiple times indicates to the device logic that an unauthorized user is attempting to "crack" the password, causing the device logic to wipe the memory. Wiping includes simple formatting, redundant overwriting, physical destruction, etc. Such a feature may help to prevent the theft of highly sensitive data from the smartphone.

Figure 4:
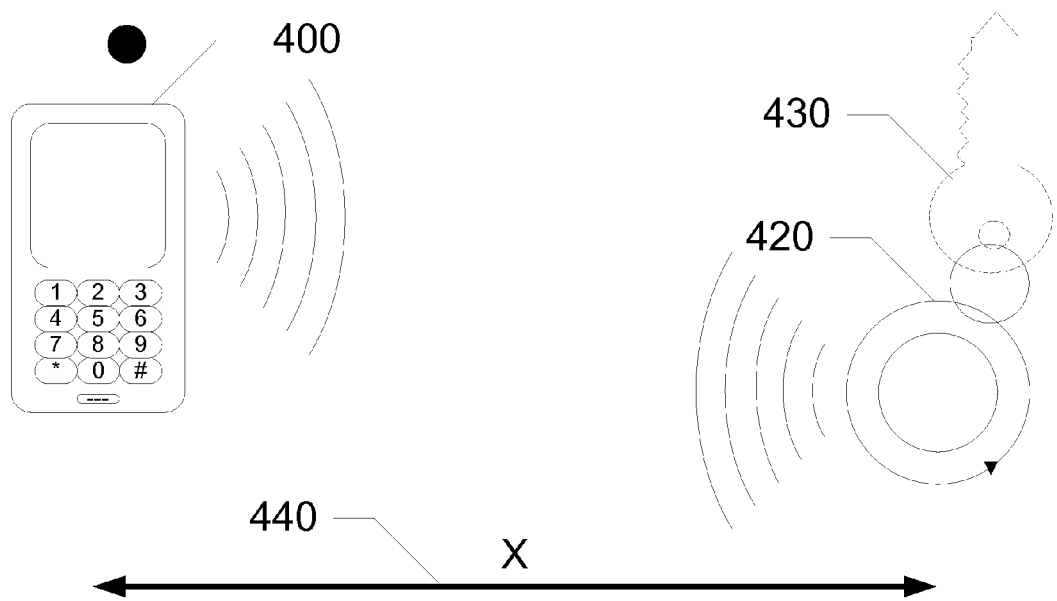
FIG. 4 shows the separation of a wireless communication device from a proximity security token, according to an exemplary embodiment of the present invention.

FIG. 4 shows the separation of a wireless communication device 400 from a proximity security token 420, according to an exemplary embodiment of the present invention. Proximity security token 420 is shown on a keychain with a key 430 such that it is likely to be carried with a user. In this exemplary embodiment, both wireless communication device 400 and proximity security token 420 detect the proximity to each other. Proximity security token 420 and wireless communication device 400 send out signals which are measured by the other. The strength of the signal is used to determine a distance between wireless communication device 400 and proximity security token 420. Alternatively, rather than measuring the signals, proximity security token 420 and wireless communication device 400 may simply determine whether or not a signal sequence is received within a prescribed amount of time. The signals may be transmitted at a strength that is only received when proximity security token 420 and wireless communication device 400 are within proximity. When wireless communication device 400 and proximity security token 420 are separated by more than an established distance, they are no longer within the set proximity. At this point, both wireless communication device 400 and proximity security token 420 emit an audible tone, notifying the user that he or she is leaving the other behind. The set proximity may be set at a time of manufacturing, at a time of uploading a security application to wireless communication device 400, by a user of wireless communication device 400, etc. For example, when both proximity security token 420 and wireless communication device 400 are able to sense the proximity of each other, both will emit the audible tone when separated. Such a feature may be useful, for example, when leaving a smartphone (or keys) in a taxi cab.

In other exemplary embodiments, only the wireless communication device is able to sense the proximity of the proximity security token. Because the proximity security token does not detect the distance of the wireless communication device, only the wireless communication device emits the audible tone. This feature is useful in a proximity security token without a power supply, for instance an RFID proximity security token, or one having an inductive coil antenna.

Figure 5:
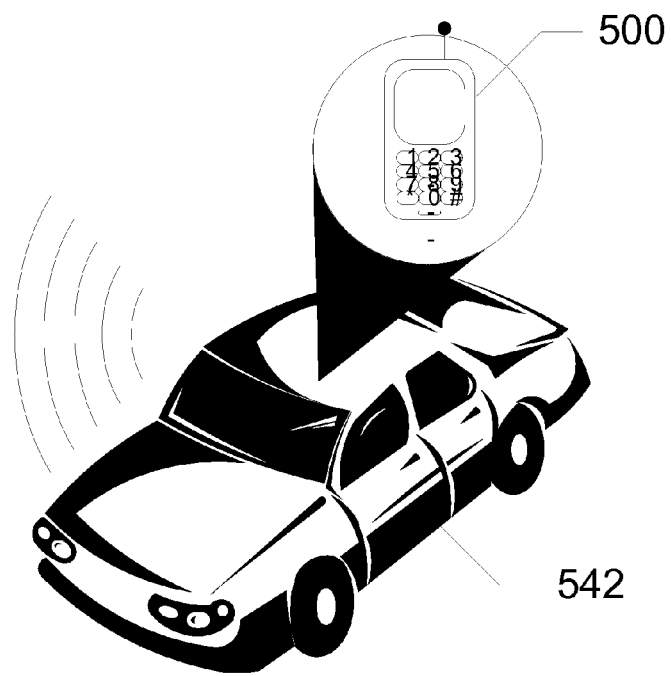
FIG. 5 shows a wireless communication device being left in an automobile, according to an exemplary embodiment of the present invention.

FIG. 5 shows a wireless communication device 500 being left in an automobile 542, according to an exemplary embodiment of the present invention. When wireless communication device 500 and the proximity security token are separated by a predetermined distance, wireless communication device emits an audible tone. For instance, when the user gets out of automobile 542 with the proximity security token but without wireless communication device 500, wireless communication device 500 and the proximity security token are separated. Wireless communication device 500 detects the separation. Once the separation exceeds the established proximity, wireless communication device 500 emits an audible tone. This notifies anyone remaining in automobile 542 that wireless communication device 500 is being left behind.

In further embodiments of the present invention, when the wireless communication device detects a separation from the proximity security token, the wireless communication device sends a signal which is received by a transceiver of an automobile, causing the automobile to emit an audible tone such as a horn. Such an audible tone may be easier for the user to hear from outside the automobile. This feature can come preloaded on an automobile, or may be available as an aftermarket addition.

Figure 6:
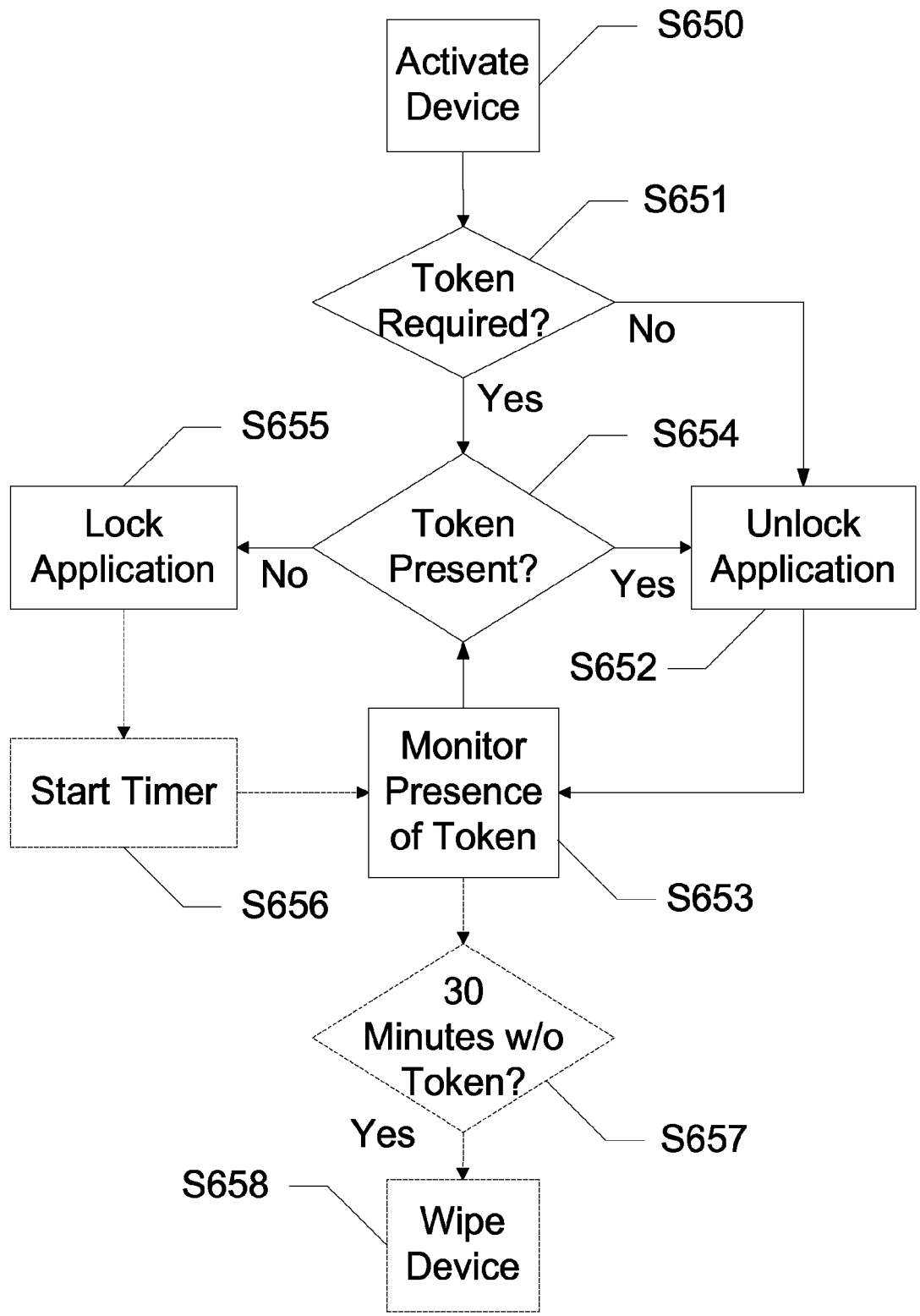
FIG. 6 shows a method of the present invention utilizing a proximity security token for unlocking an application on a wireless communication device, according to an exemplary embodiment of the present invention.

FIG. 6 shows a method of the present invention utilizing a proximity security token for unlocking an application on a wireless communication device, according to an exemplary embodiment of the present invention. In this embodiment, a user activates the wireless communication device and attempts to access the application S650, for instance, by pressing an icon on a touchscreen display of the wireless communication device. Device logic on the wireless communication device determines whether a proximity security token is required to access the application S651. If the proximity security token is not required, then the application is available for use by the user S652. If the proximity security token is required for the application, then the application remains inaccessible until the device logic determines whether the proximity security token is present S654. This may be accomplished by detecting and/or measuring signals from the proximity security token to the wireless communication device. In addition to being present, the device logic may also require the proximity security token to be activated, such as by pressing a button on the proximity security token, inputting a biometric to the proximity security token, etc. If the proximity security token is required, but not present, then the application remains locked S655. If the proximity security token is present, then the application is unlocked for use by the user S652. The device logic constantly or periodically monitors for the presence of the proximity security token while the application is unlocked S653. The device logic determines whether the proximity security token is present S654. If the proximity security token remains present, then the application remains unlocked S652. If the proximity security token is no longer in proximity to the wireless communication device, then the application is locked S655. In certain embodiments of the present invention, when the application is locked S655, the wireless communication device starts an internal timer S656. The wireless communication device monitors for the presence of the proximity security token S653. The wireless communication device determines whether the proximity security token has been absent from the proximity for more than a set period of time S657, such as thirty minutes, as measured by the internal timer and either established by the user or by pre-set logic. If the proximity security token is absent for the set period of time, the memory of the wireless communication device is wiped S658. Such a feature may be set by the user for wireless communication devices containing sensitive information. This may serve to prevent sensitive data from being stolen from the wireless communication device.

In some embodiments of the present invention, a proximity security token may be in a fixed location, such as an office building, such that a business application on a wireless communication device may only be used in that location. It may be desirable to have access to a virtual private network limited to devices in the office building. Applications such as a notepad may be used at any location. Thus, a notepad application on a laptop associated with the proximity security token can be accessed by a user from home while the laptop is at home. However, if the user tries to access the business application, the business application is locked because the proximity security token is not present at home. When at the office building with the laptop, the proximity security token is in proximity of the laptop and the user is allowed to access the business application. Logic on the laptop constantly monitors whether the proximity security token is within a set proximity. Thus, if the user is accessing the business application while leaving the building with the laptop, the business application locks when the user leaves the building, as it is no longer in proximity with the proximity security token.

In other exemplary embodiments the entire memory need not be wiped, but only a sensitive portion of the memory, as defined by a user of the wireless communication device, a user's employer, a service provider, or an author of the sensitive data.

Figure 7:
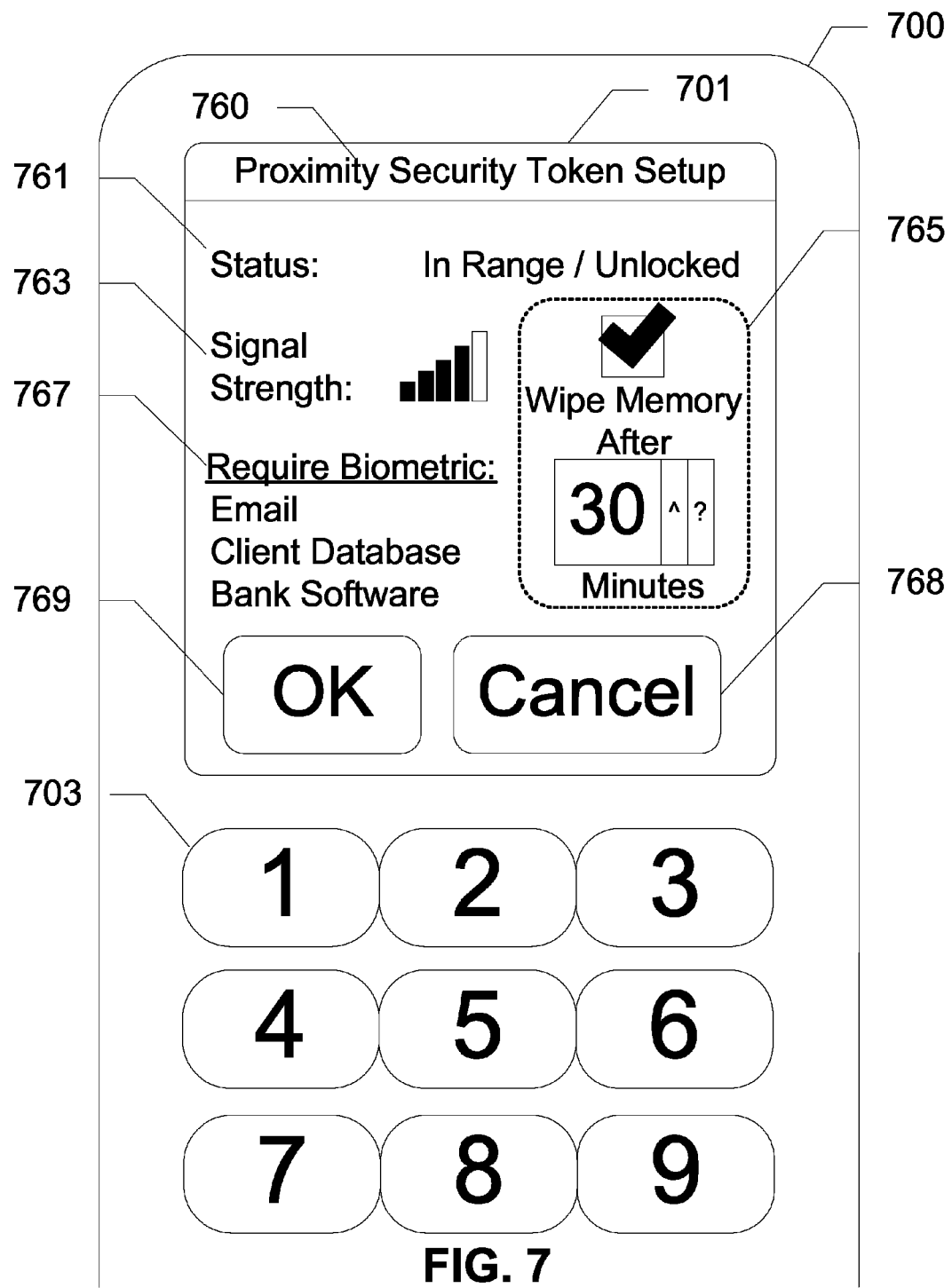
FIG. 7 shows a screenshot of a user setup of a security application for use with a proximity security token, according to an exemplary embodiment of the present invention.

FIG. 7 shows a screenshot of a user setup 760 of a security application for use with a proximity security token, according to an exemplary embodiment of the present invention. In this embodiment, user setup 760 is shown on a display 701 of a wireless communication device 700. User setup 760 includes a status 761, a signal strength 763, a biometric requirement 767, a memory purging option 765, an 'OK' button 769, and a 'Cancel' button 768. Other settings will be evident to one skilled in the art in light of this disclosure.

A user may use a keypad 703 on wireless communication device 700 to select from options on user setup 760. Status 761 displays a current status of wireless communication device 700 with respect to the proximity security token. For instance, status 761 shows that the proximity security token is in range and wireless communication device 700 is currently unlocked. Signal strength 763 displays a current signal strength between wireless communication device 700 and the proximity security token. Using status 761, for a specific signal strength the user may specify that at the current strength wireless communication device 700 should be locked. Biometric requirement 767 allows the user to determine what, if any, biometric is required to unlock the device and/or an application, and for which applications. For instance, the screenshot shows that email, client database, and bank software require a biometric. Memory purging option 765 allows the user to set a time at which the memory of wireless communication is purged 765. This time is an amount of time wireless communication device 700 is out of proximity with the proximity security token. 'OK' button 769 allows the user to accept the current settings. 'Cancel' button 768 does not accept the current settings but instead reverts to previous settings. These settings may also be pre-set for the user at the time the security application is loaded onto wireless communication device 700.

There are many ways to display the options associated with the proximity security token. Of the options in FIG. 7, more detailed options can be specified. The memory need not be wiped completely in every application. For some applications, only a portion of the memory may need purging. Applications requiring biometrics may need specific forms of biometric in order to be accessed. Different tokens may come with different forms of input. The options displayed will match the available input.

Figure 8A:
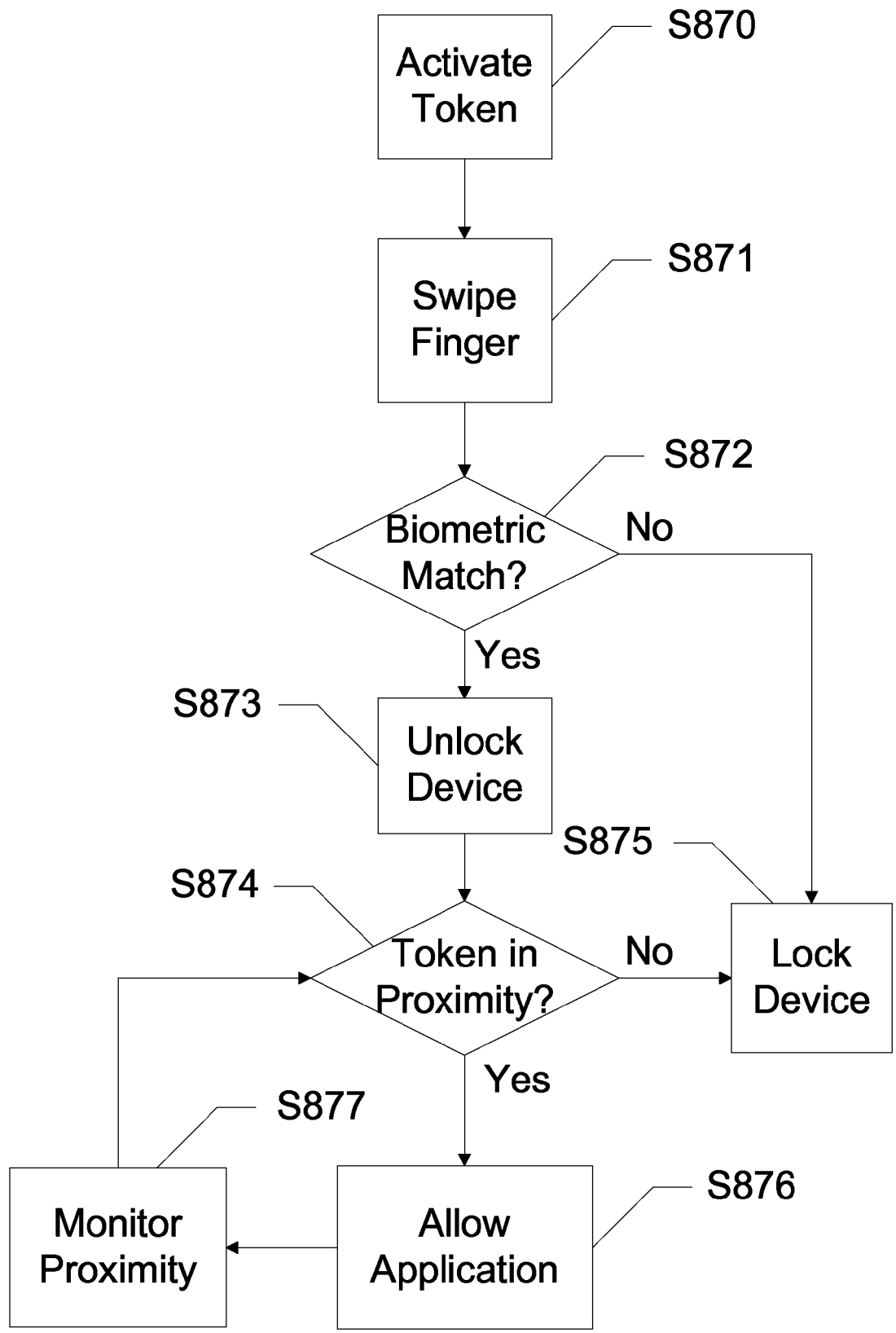
FIG. 8A shows a method of the present invention utilizing a proximity security token for unlocking a device and application, according to an exemplary embodiment of the present invention.

FIG. 8A shows a method of the present invention utilizing a proximity security token for unlocking a device and application, according to an exemplary embodiment of the present invention. In this embodiment, the user must first activate the proximity security token S870. This may be accomplished by touching the proximity security token, pressing a button on the proximity security token, swiping a finger on an input of the proximity security token, etc. With the proximity security token activated, the user manipulates a biometric sensor on the proximity security token S871. This may be swiping the users fingerprint on the biometric sensor, scanning the iris of the user with the biometric sensor, detecting the voice of the user, etc. The wireless communication device then determines whether the biometric input matches a biometric for an authorized user S872. Alternatively, logic on the proximity security token determines whether the biometric input matches an authorized user and sends a confirmation to the device. If the biometric input does not match, then the wireless communication device is locked and inoperable S875. If the biometric input matches an authorized user, then the wireless communication device is unlocked S873. With the wireless communication device unlocked, logic on the wireless communication device determines whether the proximity security token remains in proximity to the wireless communication device S874. If the proximity security token is no longer in proximity to the wireless communication device, then the wireless communication device is locked and becomes inoperable S875. If the proximity security token remains in proximity to the wireless communication device, then the device remains unlocked and access to applications is granted S876. The wireless communication device continues to monitor the proximity while the device is in use S877. If the proximity security token is no longer in proximity to the wireless communication device, then the wireless communication device is locked S875. The wireless communication device remains unlocked while the proximity security token remains in proximity.

For example, a user grabs their smartphone and proximity security token before heading out for the day. While the smartphone is not in use, the proximity security token may be in a low power mode, or sleep mode. The user activates the proximity security token by pressing a button on the proximity security token, bringing the proximity security token out of sleep mode. The user then swipes a finger across a fingerprint scanner on the proximity security token. The smartphone determines that the biometric entry matches that of the user and unlocks the smartphone. With the biometric match, the smartphone remains unlocked while in the proximity of the proximity security token.

Either the press of the button or the swiping of the finger may bring the proximity security token into an active mode. According to embodiments of the present invention, the proximity security token must be present and active to unlock the smartphone and/or applications on the smartphone.

In other exemplary embodiments of the present invention, the user sets a limited duration for the unlocked mode. Once unlocked, a timer in the proximity security token begins to count down for the duration. After the duration expires, the user is required to re-authenticate by swiping the user's finger once again. For example, the user may program the smartphone to require authentication after every hour, after five minutes of non-use, etc.

In further exemplary embodiments of the present invention, an application may require a secondary authentication in order to process a request. The user may utilize the proximity security token to input the secondary authentication, such as a biometric of the user.

Figure 8B:
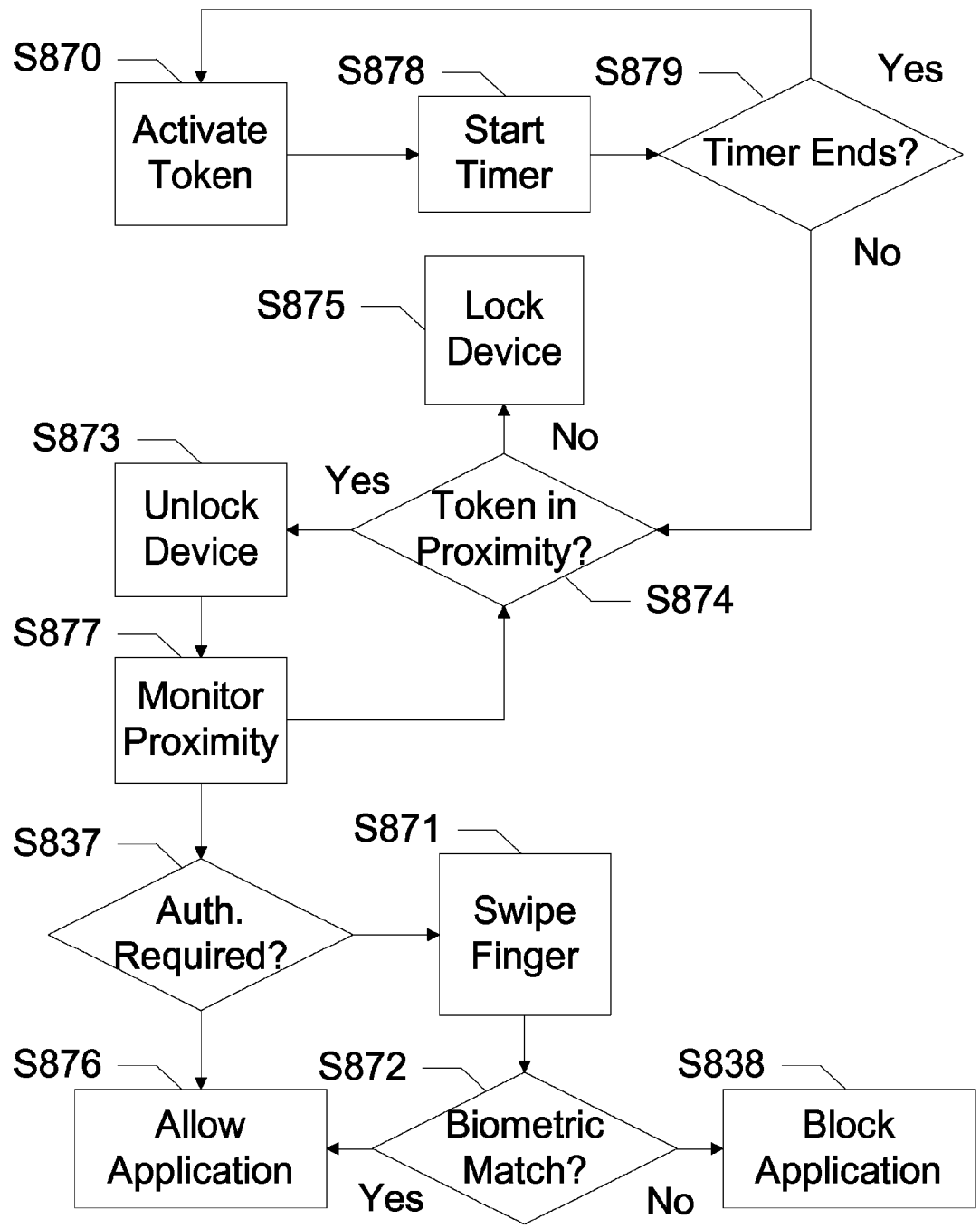
FIG. 8B shows a method of the present invention utilizing a proximity security token for unlocking a device and application, according to an exemplary embodiment of the present invention.

FIG. 8B shows a method of the present invention utilizing a proximity security token for unlocking a device and application, according to an exemplary embodiment of the present invention. In this embodiment, the user must first activate the proximity security token S870. This may be accomplished by touching the proximity security token, pressing a button on the proximity security token, swiping a finger on an input of the proximity security token, etc. With the proximity security token activated, a timer on the proximity security token starts S878. The timer lasts for a period of time in which the proximity security token is to remain active. This period of time may be set by the user, by a manufacturer, by a wireless communication device, etc. The method determines whether the period of time has elapsed and the timer has ended S879. If the timer has ended, the user must activate the token again S870. If the timer has not ended, the wireless communication device and/or the proximity security token determines whether the proximity security token is in proximity of the wireless communication device S874. If the proximity security token is not in proximity of the wireless communication device, the wireless communication device is locked S875. If the proximity security token is in proximity of the wireless communication device, the wireless communication device is unlocked S873. With the wireless communication device unlocked, the wireless communication device monitors the proximity of the proximity security device S877. The user then attempts to access an application. The wireless communication device determines whether a secondary authentication is required to access the application S837. If secondary authentication is not required, access to the application is allowed S876. If secondary authentication is required, the user must swipe a finger on the proximity security token S871 or otherwise enter a biometric. The wireless communication device and/or the proximity security token determines whether the user's biometric matches a stored biometric for the user S872. If the user's biometric matches, access to the application is allowed S876. If the user's biometric does not match, access to the application is blocked S838.

FIGS. 9A and 9B show proximity security tokens in the form of key fobs with an embedded input, according to embodiments of the present invention. The embedded inputs allow for a second level of authentication of a user, in addition to the proximity of the proximity security token to a wireless communication device. Embedded inputs could be in many varying forms of icon usage such as numbers or symbols. In FIG. 9A, the input is a biometric sensor, such as a fingerprint scanner 926 on proximity security token 920. In this embodiment, fingerprint scanner 926 is used as a secondary authentication. When a user swipes a finger across fingerprint scanner 926, an image of the fingerprint is optically scanned. The image is then compared to a previously recorded image in order to authorize the user. In this embodiment, the comparison is accomplished by logic on board proximity security token 920. Proximity security token 920 is portable, sealed to be weatherproof, and attached to a keychain 930.

In FIG. 9B, the input is a keypad 928 on a proximity security token 920. Keypad 928 is used to enter a key or key sequence to further authenticate a user. The key sequence is compared with a stored key sequence. A match confirms the user is an authorized user. In this embodiment, the comparison is performed by logic on board proximity security token 920.

In other exemplary embodiments, the fingerprint scanner or the keypad is used to energize or awaken the proximity security token from a low-power or sleep mode. The comparison of a key sequence or fingerprint scan is alternatively accomplished by a wireless communication device being unlocked. Proximity security token may be any shape or size, and may be ergonomically and/or visually appealing.

Figure 10:
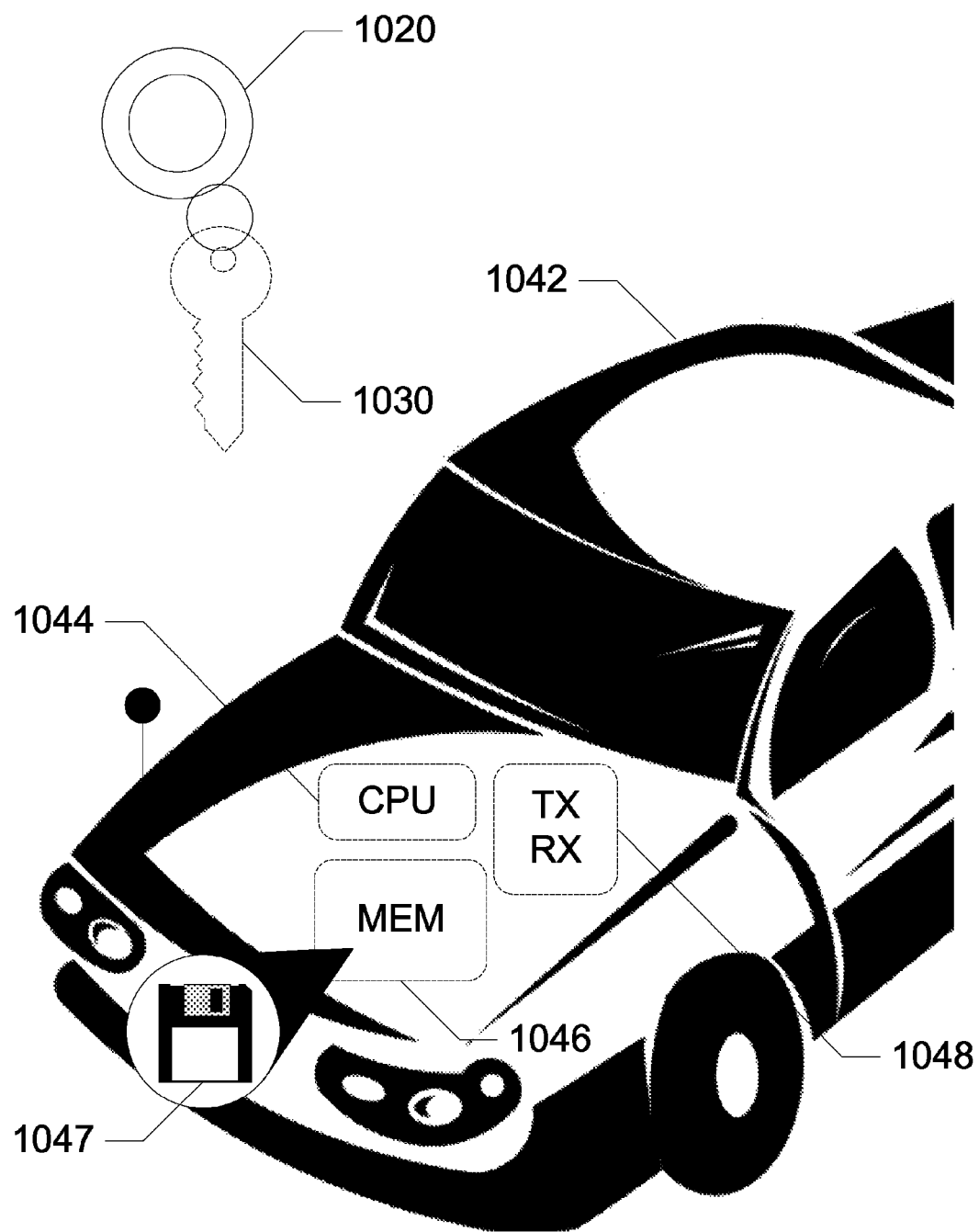
FIG. 10 shows a proximity security token further being used to unlock an automobile, according to an exemplary embodiment of the present invention.

FIG. 10 shows a proximity security token 1020 being used to unlock an automobile 1042, according to an exemplary embodiment of the present invention. In this embodiment, automobile 1042 is unlocked and/or able to be started due to the detection of proximity security token 1020. Automobile 1042 includes a central processing unit (CPU) 1044, a memory 1046 containing an automobile logic 1047, and a transceiver 1048 in order to determine a distance of proximity security token 1020. In this embodiment, proximity security token 1020 is shown on a keychain 1030, such that it remains in the possession of a user. When the user in possession of proximity security token 1020 walks within the proximity of automobile 1042, at a set distance, logic 1047 automatically unlocks automobile 1042. In this embodiment, the engine of automobile 1042 also starts automatically due to the proximity of proximity security token 1020. CPU 1044, transceiver 1048, and logic 1047 are used to determine a distance between automobile 1042 and proximity security token 1020. At one detected distance, logic 1047 causes the door or doors to unlock. At the same distance or a second detected distance, logic 1047 causes automobile 1042 to start.

In other embodiments, the automobile starts at a shorter distance than the unlocking of automobile 1042, such as when the user with proximity security token 1020 is in the driver's seat of automobile 1042. Alternate embodiments allow the user to set distances for starting and unlocking. For instance, a user may desire to start the automobile at a further distance, allowing the inner cabin of automobile 1042 to reach a comfortable climate. Another user may not want automobile 1042 to unlock until the user is right next to automobile 1042. In some embodiments, the user sets automobile 1042 to only unlock the driver's side door, while other embodiments enable a user to set automobile 1042 to unlock all the doors. In embodiments of the invention, after the doors of automobile 1042 have been opened due to the proximity of proximity security token 1020, starting the ignition of automobile 1042 requires a secondary authentication with a biometric, code, etc.

Figure 11:
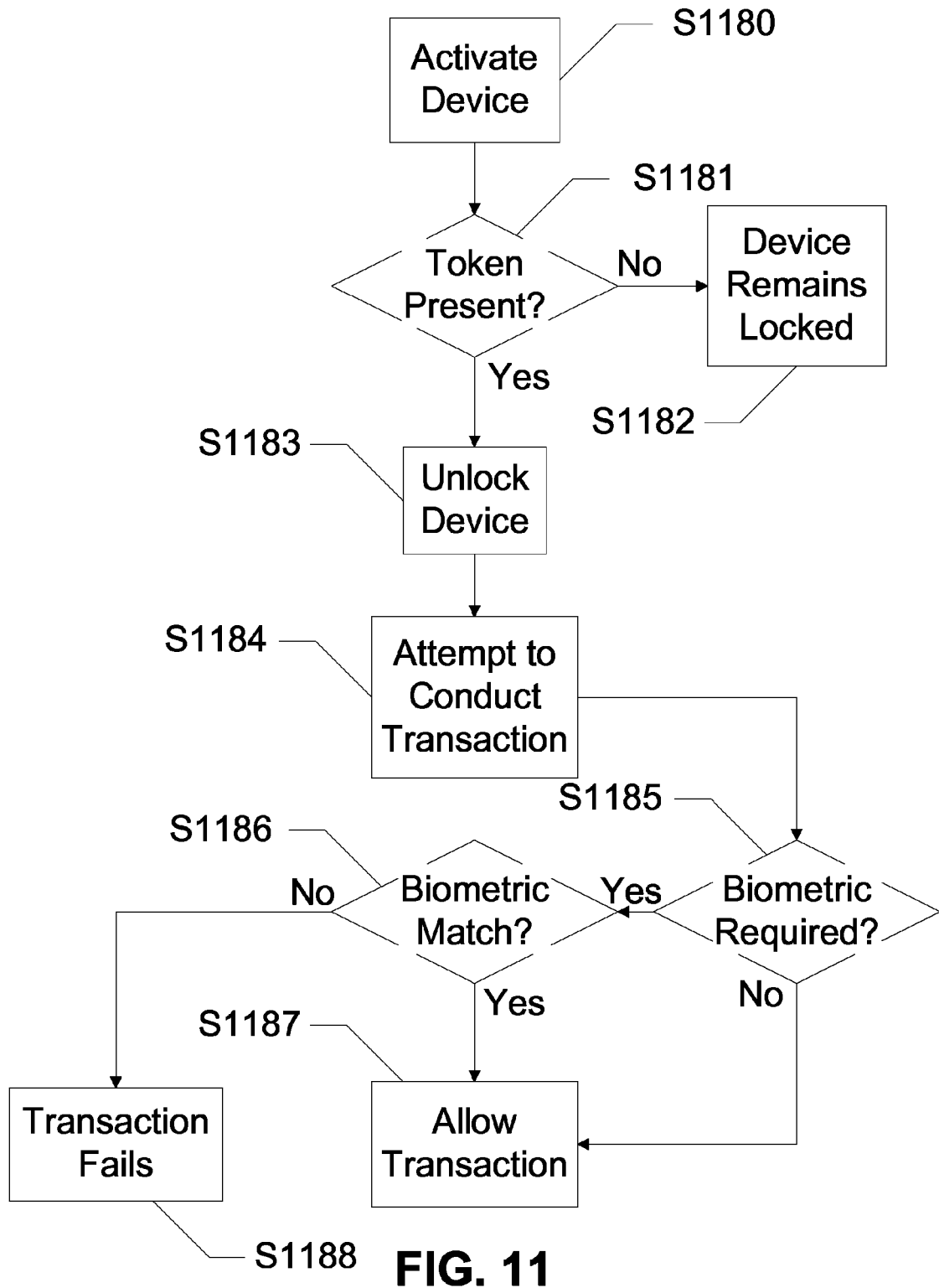
FIG. 11 shows a method of utilizing a biometric sensor on a proximity security token, according to an exemplary embodiment of the present invention.

FIG. 11 shows a method of utilizing a biometric sensor on a proximity security token, according to an exemplary embodiment of the present invention. In this embodiment, a user makes an attempt to activate a wireless communication device S1180, for example, a smartphone. This attempt is made by touching the screen, pressing a button, etc. Device logic on the wireless communication device determines whether the proximity security token, or key fob, is present S1181. This is accomplished by invoking a transceiver to communicate with the proximity security token, and determining a distance between the wireless communication device and the proximity security token using the methods described herein. If the proximity security token is not present, then the wireless communication device remains locked and the user cannot access applications on the wireless communication device S1182. If the proximity security token is present, then the wireless communication device is unlocked, allowing the user to access applications, make calls, etc. S1183. With the wireless communication device unlocked, an attempt is made to conduct a transaction on the wireless communication device S1184. This transaction may be a purchase, a download, an upload, an attempt to access an application or web service, etc. The device logic on the wireless communication device determines whether a biometric is required to conduct the transaction S1185. This determination may be made based upon rules stored within the device logic, requests for authentication from outside entities, requests from an independent operation such as a web service, etc. A required biometric provides an extra layer of security for the transaction. If a biometric is not required for the transaction, then the transaction is allowed S1187. If a biometric is required, then the logic determines whether an input biometric matches a stored biometric for an authorized user S1186. This logic could be performed either on the proximity security token and/or the wireless communication device. This biometric may be a fingerprint scan, an iris scan, a voice detection, etc stored on either the proximity security token or the wireless communication device. If the biometric matches the stored biometric, then the transaction is allowed S1187. If the biometric does not match the stored biometric, then the transaction fails S1188.

In further embodiments of the invention, a failed biometric locks the entire device, while in other embodiments other applications on the device may still be used. Instead of conducting a transaction, the same process is used to access an application or database in other embodiments. In other exemplary embodiments, the user may desire to use a smartphone to access a mobile banking application. The user unlocks the smartphone by attempting to access the smartphone with the proximity security token present. The user then attempts to access the mobile banking application. This application requires a higher level of security than other applications, and the user's fingerprint is requested on the proximity security token. The user scans their fingerprint on the proximity security token. If the user's fingerprint matches the authorized fingerprint for the application, then the user is able to access the mobile banking application.

Alternatively, the user accesses a bank's website over a mobile browser that requires the user to log in using a username and password. The bank website requires two-factor authentication and requests the smartphone to authenticate the user's identity. The smartphone prompts the user to swipe the user's finger on the proximity security token. If the fingerprint matches, then the authentication succeeds and the user can access the bank website. In these embodiments, a fingerprint match releases a one-time password to the smartphone, which in turn submits the one-time password or other authentication credential or authorization to the bank website to complete the authentication process.

Figure 12:
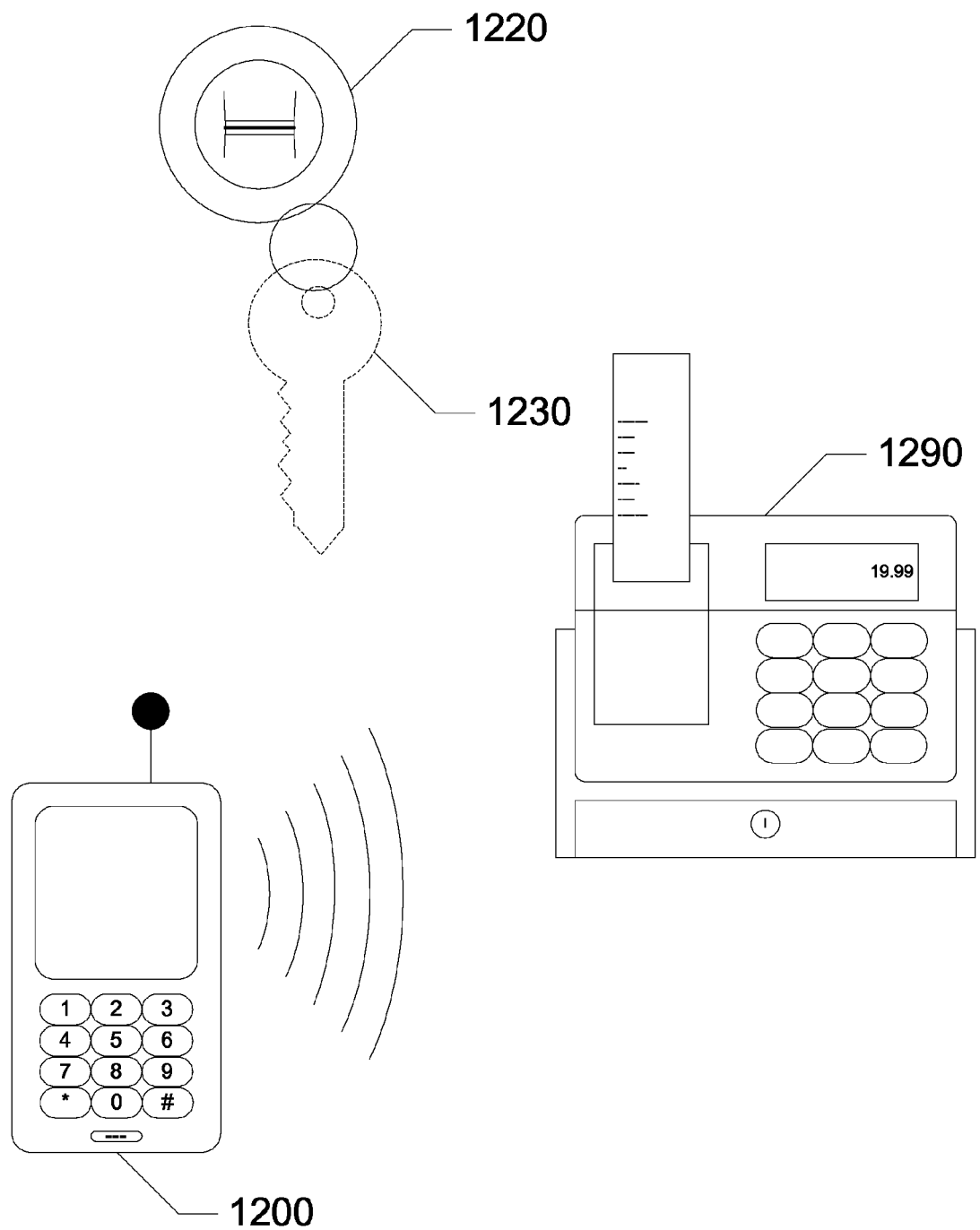
FIG. 12 shows a proximity security token used to authenticate a transaction, according to an exemplary embodiment of the present invention.

FIG. 12 shows a proximity security token 1220 used to authenticate a transaction, according to an exemplary embodiment of the present invention. In this embodiment, a wireless communication device 1200 is being used to make a payment to a register 1290, for instance, using Near Field Communication (NFC). A user rings up an item at register 1290 and proceeds to payment. An application on wireless communication device 1200 first confirms that proximity security token 1220 is within a set proximity to wireless communication device 1200 to proceed with the purchase process. In order to initiate a payment, the application makes a request to the user to provide authentication to proximity security token 1220 with a fingerprint as a second factor for authentication of the user. Once proximity security token 1220 authorizes the fingerprint, wireless communication device 1200 sends the payment information to register 1290 and the payment transaction is complete. Such a transaction uses a one-time password (OTP) token standard. In other exemplary embodiments of the present invention, second-factor authentication is only required when a payment amount is over a specified amount or given some other user or system defined parameters.

In an alternative embodiment, the wireless communication device authorizes the fingerprint or other biometric of the user. Credentials for the user are stored on the wireless communication device, such as in the UICC, SIM card, or a memory of the wireless communication device. The proximity security token transmits a fingerprint template of the scanned fingerprint to the wireless communication device where the fingerprint template is verified with the credentials. Once the wireless communication device verifies the fingerprint, the wireless communication device sends the payment information to the register and the payment transaction is complete.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A secure wireless communication device, comprising:
a processor; and
a memory coupled to the processor, the memory storing an application and instructions that, when executed by the processor, cause the processor to perform operations comprising
locking the application, wherein the application is installed at the secure wireless communication device,
detecting an attempt to access the application that is installed at the secure wireless communication device,
in response to detecting the attempt to access the application that is installed at the secure wireless communication device, determining that a proximity security token is required to access the application that is installed at the secure wireless communication device,
in response to determining that the proximity security token is required to access the application that is installed at the secure wireless communication device, measuring signals emitted by the proximity security token to determine if the proximity security token is within a predefined distance of the secure wireless communication device,
if a determination is made that the proximity security token is not within the predefined distance of the secure wireless communication device,
starting a timer,
determining, in response to expiration of the timer, if the proximity security token is within the predefined distance, and
in response to determining that the proximity security token is not within the predefined distance, entirely wiping the memory that stores the instructions and the application that is installed at the secure wireless communication device, and
if a determination is made that the proximity security token is within the predefined distance of the secure wireless communication device, obtaining a unique identifier from the proximity security token, and in response to obtaining the unique identifier, unlocking the application that is installed at the secure wireless communication device.

2. The secure wireless communication device of claim 1, wherein the instructions, when executed by the processor, cause the processor to perform operations further comprising:
after unlocking the application that is installed at the secure wireless communication device, determining if the proximity security token remains within the predefined distance of the secure wireless communication device;
in response to a determination that the proximity security token does not remain within the predefined distance of the secure wireless communication device, locking the application that is installed at the secure wireless communication device;

starting a timer for a set time period upon locking the application that is installed at the secure wireless communication device;

determining, in response to expiration of the timer, if the proximity security token is within the predefined distance of the secure wireless communication device; and in response to determining that the proximity security token is not within the predefined distance of the secure wireless communication device, wiping a portion of the memory.

3. The secure wireless communication device of claim 1, wherein the instructions, when executed by the processor, cause the processor to perform operations further comprising:

after unlocking the application that is installed at the secure wireless communication device, determining if the proximity security token remains within the predefined distance;

in response to a determination that the proximity security token does not remain within the predefined distance, locking the application that is installed at the secure wireless communication device;

starting a timer for a set time period upon locking the application that is installed at the secure wireless communication device;

determining, in response to expiration of the timer, if the proximity security token is within the predefined distance; and in response to determining that the proximity security token is not within the predefined distance, entirely wiping the memory that stores the instructions and the application that is installed at the secure wireless communication device.

4. The secure wireless communication device of claim 1, further comprising a display, wherein the instructions, when executed by the processor, causes the processor to perform operations further comprising displaying a plurality of security settings on the display, wherein the plurality of security settings include a setting for specifying a time period associated with the timer.

5. The secure wireless communication device of claim 4, wherein the plurality of security settings comprise an option to entirely wipe the memory after the time period and a further option for requiring biometric information.

6. The secure wireless communication device of claim 5, further comprising an input device, wherein the plurality of security settings are adjustable via the input device.

7. The secure wireless communication device of claim 1, further comprising a speaker, wherein the operations further comprise emitting a sound through the speaker upon detecting an absence of the proximity security token.

8. The secure wireless communication device of claim 1, wherein the unique identifier comprises a digital key.

9. The secure wireless communication device of claim 1, wherein the proximity security token is configured to optically scan a fingerprint to create an image, to compare the image to a previously recorded image, and to authorize access if the image matches the previously recorded image.

10. The secure wireless communication device of claim 1, wherein the instructions, when executed by the processor, cause the processor to perform operations further comprising:

determining if the proximity security token remains within the predefined distance;

in response to a determination that the proximity security token does not remain within the predefined distance, causing a vehicle to generate an audible alert.

11. The secure wireless communication device of claim 1, wherein the secure wireless communication device comprises a smartphone.

12. A method comprising:

locking, by a wireless communication device comprising a memory that stores an application, the application, wherein the application is installed at the wireless communication device;

detecting, by the wireless communication device, an attempt to access the application that is installed at the wireless communication device;

in response to detecting the attempt to access the application that is installed at the wireless communication device, determining, by the wireless communication device, that a proximity security token is required to access the application that is installed at the wireless communication device;

in response to determining that the proximity security token is required to access the application that is installed at the wireless communication device, measuring signals emitted by the proximity security token to determine if the proximity security token is within a predefined distance of the wireless communication device;

if a determination is made that the proximity security token is not within the predefined distance of the wireless communication device,
starting a timer,
determining, in response to expiration of the timer, if the proximity security token is within the predefined distance, and in response to a determination that the proximity security token is not within the predefined distance, entirely wiping the memory that stores the instructions and the application that is installed at the wireless communication device; and in response to a determination that the proximity security token is within the predefined distance of the secure wireless communication device, requesting, by the wireless communications device, a unique identifier from the proximity security token, and in response to obtaining the unique identifier from the proximity security token, unlocking, by the wireless communications device, the application that is installed at the secure wireless communication device.

13. The method of claim 12, further comprising generating a one-time password.

14. The method of claim 12, wherein the unique identifier comprises a digital key.

15. The method of claim 12, wherein the proximity security token is configured to optically scan a fingerprint to create an image, to compare the image to a previously recorded image, and to authorize access if the image matches the previously recorded image.

16. The method of claim 12, wherein the secure wireless communication device comprises a smartphone.

17. A system comprising:
a proximity security token; and
a smartphone comprising a processor and a memory coupled to the processor, the memory storing an application and instructions that, when executed by the processor, cause the processor to perform operations comprising locking the application, wherein the application is installed at the smartphone, detecting an attempt to access the application that is installed at the smartphone, in response to detecting the attempt to access the application that is installed at the smartphone, determining that the proximity security token is required to access the application that is installed at the smartphone, in response to determining that the proximity security token is required to access the application that is installed at the smartphone, measuring signals emitted by the proximity security token to determine if the proximity security token is within a predefined distance of the smartphone, if a determination is made that the proximity security token is not within the predefined distance of the smartphone, starting a timer, determining, in response to expiration of the timer, if the proximity security token is within the predefined distance, and in response to determining that the proximity security token is not within the predefined distance, entirely wiping the memory that stores the instructions and the application that is installed at the smartphone, and if a determination is made that the proximity security token is within the predefined distance of the smartphone, obtaining a unique identifier from the proximity security token, and in response to obtaining the unique identifier, unlocking the application that is installed at the smartphone.

18. The system of claim 17, wherein the proximity security token comprises an outer cover and a plurality of diodes on the outer cover.

19. The system of claim 17, wherein the plurality of diodes comprise a first diode, a second diode, and a third diode, wherein the first diode indicates a fully unlocked state, wherein the second diode indicates a partially unlocked state, and wherein the third diode indicates a fully locked state.

20. The system of claim 17, wherein the proximity security token comprises a fingerprint scanner.

* * * * *